3,669,684
PROCESS FOR FLAVORING FOODS
Elmer A. Weaver, Main St., Spring Mount, Pa. 19478
No Drawing. Continuation of application Ser. No.
544,853, Apr. 25, 1966. This application June 11,
1969, Ser. No. 845,592
Int. Cl. A23l 1/22, 1/00
U.S. Cl. 99—100                                                4 Claims

ABSTRACT OF THE DISCLOSURE

A process of modifying the flavor of a fresh natural food is described which includes the treating of a fresh natural food with an atmosphere containing an odor characteristic which is capable of being absorbed by the food and continuing the treatment while preserving the food in its fresh state until the necessary flavor modification of the food has occurred. By this means, fresh whole eggs, fresh whole fruit and vegetables, and nuts may have their flavors modifyed to suit the taste.

---

This application is a continuation of U.S. patent application No. 544,853 filed Apr. 25, 1966, now abandoned.

My invention relates to processes for flavoring foods, and it relates more particularly to the process of imparting flavor to an already existing food or food ingredient, without changing its texture or essential chemical nature. Such foods for instance include basic raw or fresh foods such as vegetables, fruits, nuts and eggs.

It is well known that many tree ripened fruits and fresh vegetables have a special and most delicious flavor which is lost shortly after the fruit or vegetable is picked. One object of my invention is to provide a process whereby such special flavor may be restored to an already picked fruit or vegetable, regardless of the lapse of time between the picking and the restoration. For instance, the food may be picked at a farm or grove in one part the country and shipped to a market thousands of miles away, wherein it is offered for sale perhaps weeks later, but by means the process of my invention the characteristic flavor of a tree ripened or plant ripened food can be restored to it at the time and location of actual sale to the consumer.

It is also well known that the quality and intensity of flavor of many types of foods varies according to the vagaries of the seasons in which they are grown, or the circumstances of their cultivation. Thus for instance, a certain type of apple may be most delicious when it is ripened during frosty, clear weather, but is of a bland flavor when the ripening season is warm or wet. Another object of my invention is therefore to provide a process for imparting to such foods the full flavor which they would have had if they were ripened under optimum seasonal or cultivation conditions.

Also, certain foods such for instance as avocados, artichokes or mushrooms are known for their subtitle flavor which is escaped by many. A further object of my invention is to provide a process whereby the flavor of such foods can be augmented by an increased amount of the same flavor, or a taste-perception enhancing ingredient may be added to the food in its natural state, in such a manner as to enrich the flavor thereof.

It has also been found that certain foods are capable of blending with other foods to produce a delicious combination. This occurs for instance in blends of orange with pineapple or apricot, or blends of pineapple with grapefruit or pear. Another object of my invention is to provide a process whereby a given food in its natural state may have imparted to it a flavor of another food, such that the single natural food will itself contain the blended flavors.

Moreover, in the cooking art there is need to combine various natural foods which are cooked together so as to blend their flavors in the ultimate product. Thus for instance the cook may be required to peel and chop an onion, open an egg, and mix these ingredients with ground meat and selected spices or seasoning, whereupon the whole may be baked to provide a meat loaf. The onion-handling procedure may be very unpleasant to the cook. Another object of my invention accordingly is to provide a process whereby the onion flavor may be imparted to another uncooked ingredient such for instance as the egg and said two-flavored ingredient utilized in the recipe in place of the two ingredients. It is to be understood of course, that garlic or other flavor may be substituted for onion in the example.

Moreover, many otherwise desirable foods which are known for their delicious flavor, are objectionable because of their high calorie content. Such foods for instance may include nuts, chocolate, butter, cheese, cream or the like. A further object of my invention is to provide a process whereby foods may have imparted to them the delicous flavor of another food or greater calorie content, without increasing the calorie content of the ultimate product.

Another object of my invention is to provide a process of imparting a flavor to a food in its natural state, without adversely changing the texture or appearance of said food.

It has been known that flavor can be imparted to prepared or cooked foods by adding a flavoring ingredient to the preparation materials. For instance, it is well known to add salt or onion to the ingredients which are to be cooked together in the preparation of a cooked food. It has also been known to impart flavor by subjecting a food ingredient to a curing process, as for instance when a ham is subjected to smoke over a very substantial period of time, the smoking having the triple function of preventing spoilage during the curing process, changing the chemical structure of the meat so that it becomes resistant to spoilage and thereby curing it, and bringing about a smoked-cured flavor to the ham. Also, it is known to keep a substance moist by subjecting it to a humid atmosphere in a closed container, as for instance by the use of a cut piece of apple in the container, with perhaps a minimal flavor of the apple being thereby imparted to the substance by means of the moistening process. Yet none of these processes is available in a practical manner to impart flavor without changing the texture or appearance to raw, uncooked, basic foods such as fresh fruits and eggs and raw vegetables, all of which are sold over the counter in their natural state. Nor are they available for imparting flavor to uncooked nuts, even when such nuts are sold with their shells removed.

I have discovered that it is possible to impart desired flavor to such basic foods without cooking, curing, or otherwise changing the texture or appearance of the basic food. Moreover, by the process of my invention, the flavor can be imparted on a commercial scale, and at the location of delivery of the basic food to the ultimate purchaser. Furthermore, the process of my invention requires the use of exceedingly inexpensive equipment, inexpensive ingredients, and very little time.

According to my intention, I subject the basic food to an atmosphere charged with what I term a migrator until the desired flavor-imparting ingredient carried by said migrator penetrates the basic food and is absorbed by it.

The migrator may consist of the concentrated aroma of the flavor which it is desired to impart to the basic food. Or it may consist of a precursor which combines with the physical, chemical or biological nature or natures of the basic food to bring about the desired flavor. Such aroma or precursor emanates from any suitable source such for instance as a flavor essence or concentrate. In some instances it may be carried by a suitable volatile vehicle. In other instances it may sublimate or evaporate, according to the nature of the aromatic substance that is used.

Various means may be used for establishing the atmosphere for the process of my invention, and my invention is not to be considered to be limited to any such specific means. For instance, the basic food and the migrator may be disposed together in a closed chamber until the desired penetration and absorption has been achieved, whereupon the basic food is removed from the chamber. Or if desired, the basic food may be placed on trays which are themselves introduced into a chamber containing the migrator, and the trays then removed from the chamber when the absorption has been completed. Or the basic foods may be placed on a conveyor belt passing through a chamber containing the migrator. Various other modifications may be used, such for instance as placing the basic foods in a chamber, evacuating the air therefrom and substituting in place of said evacuated air, a migrator atmosphere. While an atmosphere consisting substantially exclusively of the migrator alone may be desirable for rapidity of penetration and absorption, it has nonetheless been found to be satisfactory to rely on the presence of inert nitrogen in the ambient atmosphere together with the oxygen thereof, and the whole intermingled with the migrator; and the specific examples herein given are accordingly limited to the use of migrator in ambient air.

Thus, in each of the following examples, the basic food was placed in a chamber leaving an air space approximately five times the volume of the basic food. A migrator was disposed on the bottom of the chamber, at a location spaced from the basic food a substantial distance. The chamber was then sealed and maintained at a temperature consistent with preservation of the basic food. Following a flavor impartation period, the seal was removed and the basic food was withdrawn from the chamber. Tests were made of the penetration of the food and absorption of flavor from the migrator, and also the quality of flavor thus imparted to the food. In each instance, sufficient migrator was used to assure saturation of the atmosphere within the chamber. Where the examples are given with charts, the degree of flavor impartation is shown according to the following schedule:

a indicates maximum quantity of desired flavor or odor as indicated, and fully adequate for all purposes.
b indicates substantial flavor or odor as indicated, and of sufficient quantity for most purposes.
c indicates noticeable flavor or odor as indicated, but of insufficient quantity for most purposes.
XXX indicates superb quality and strength of flavor.
XX indicates good quality and strength of flavor and fully acceptable for most purposes.
X indicates a quality and strength of flavor which is acceptable for some purposes but not for others.

EXAMPLE 1

Eggs

In this test, extra large, unbroken, fresh, chicken eggs were exposed to the migrators for sixteen hours at approximately 40° F. Following the removal from the chamber, they were cooked in the normal manner of cooking eggs, whereupon they were tested for flavor absorption and quality of flavor. The test was made with respect to both the white of egg and the yolk in the instances where the cooking permitted the two to be separated.

| Migrator source | White of egg | Yolk | Flavor quality |
|---|---|---|---|
| Soluble garlic flavor | a | a | XXX |
| Oil onion | a | a | XXX |
| Imitation blue cheese flavor compound | a | a | XXX |
| Imitation mozzarella cheese flavor compound | a | a | XXX |
| Essence of imitation sherry | a | a | XXX |
| Imitation sherry flavor | a | a | XXX |
| Imitation hickory smoke flavor | a | b | XXX |
| Hickory smoke oil | a | c | XXX |
| Imitation mushroom flavor | b | b | XXX |
| Imitation butter rum flavor | b | a | XXX |
| Solspice garlic | a | b | XX |
| Imitation onion flavor | a | b | XX |
| Imitation rum flavor | a | c | XX |
| Imitation butter flavor | c | c | XX |
| Natural garlic flavor | a | c | X |
| Viandarome seasoning for pork sausage | b | c | X |
| Fondant bourbon imitation | c | c | X |
| Imitation butterarome flavor compound | c | c | X |
| Imitation provolone flavor compound | c |  | X |
| Imitation hickory smoke flavor compound | c | c | X |
| Oil onion soluble | c | c | X |

The flavors thus added to the eggs were found to survive frying, poaching, soft boiling, hard boiling, and omelet frying. Garlic flavored eggs were capable of adding garlic flavor to a meat loaf prepared with these eggs.

EXAMPLE 2

Potatoes

In this test, medium size potatoes were exposed to the migrators for forty-eight (48) hours at a temperature of approximate 70° F. Following the removal from the chamber, they were roasted for one hour at 400° F., whereupon they were tested for flavor absorption and quality of flavor.

| Migrator source | Flavor absorption | Flavor quality |
|---|---|---|
| Soluble garlic | a | XXX |
| Oil onion | a | XXX |
| Imitation mushroom flavor | a | XXX |
| Imitation mozzarella cheese flavor | a | XXX |
| Imitation blue cheese flavor | a | XXX |
| Hickory smoke oil | a | XXX |
| Imitation hickory smoke flavor | b | XXX |
| Imitation butter and rum flavor | b | XX |
| Imitation butter flavor | c | XX |
| Imitation horse radish flavor | c | X |
| Imitation chicken flavor | c | X |

EXAMPLE 3

Tomatoes

In this test, medium size Rutgers Tomatoes were exposed to the migrators for forty-eight (48) hours at a temperature of approximately 70° F.

| Migrator source | Flavor absorption | Flavor quality |
|---|---|---|
| Oil onion | a | XXX |
| Imitation blue cheese | a | XXX |
| Hickory smoke oil flavor | a | XXX |
| Imitation mushroom flavor | c | XXX |
| Imitation butter and rum flavor | b | XX |
| Imitation hickory smoke flavor | b | XX |
| Imitation mozzarella cheese flavor | c | XX |
| Imitation butteraroma flavor | c | XX |
| Soluble garlic | c | X |

EXAMPLE 4

Oranges

In this test, California Sunkist Oranges were exposed to migrators for forty-eight (48) hours at approximately 70° F.

| Migrator source | Flavor absorption | Flavor quality |
|---|---|---|
| Veri essence of lime | a | XXX |
| Imitation butter and rum flavor | a | XXX |
| Imitation rum flavor | a | XXX |
| Imitation bourbon fondant | a | XXX |
| Imitation oil anise | b | XXX |
| Anise extract | c | XX |
| Imitation banana flavor | c | XX |
| Imitation raspberry flavor | c | X |

EXAMPLE 5

Peaches

In this test, nearly ripe Elberta Peaches were exposed to migrators for forty-eight (48) hours at a temperature of approximately 40° F.

| Migrator source | Flavor absorption | Flavor quality |
| --- | --- | --- |
| Imitation arome grape flavor | a | XXX |
| Imitation orange pineapple flavor | b | XXX |
| Imitation cocoanut flavor | b | XXX |
| Imitation oil anise | b | XXX |
| Imitation butter and rum | a | XX |
| Imitation banana flavor | b | XX |
| Oil almond bitter | b | XX |

EXAMPLE 6

Pears

In this test, nearly ripe Bartlett Pears were exposed to migrators for forty-eight (48) hours at approximately 70° F.

| Migrator source | Flavor absorption | Flavor quality |
| --- | --- | --- |
| Imitation mozzarella cheese flavor | a | XXX |
| Imitation butter and rum flavor | a | XXX |
| Cinnamon flavor | b | XXX |
| Imitation cocoanut flavor | c | XXX |
| Imitation wild cherry flavor | c | XX |
| Imitation hickory nut flavor | c | XX |
| Imitation butterscotch flavor | c | XX |
| Imitation blue cheese flavor | b | X |
| Imitation butter flavor | c | X |

EXAMPLE 7

Apples

In this test, ripe apples were exposed to migrators for forty-eight (48) hours at approximately 70° F.

| Migrator source | Flavor absorption | Flavor quality |
| --- | --- | --- |
| Imitation blue cheese flavor | a | XXX |
| Imitation arome grape flavor | b | XXX |
| Imitation black walnut flavor | b | XXX |
| Imitation bourbon fondant | c | XXX |
| Imitation hickory nut flavor | c | XX |
| Imitation mozzarella cheese flavor | c | X |
| Imitation butter and rum flavor | c | X |

EXAMPLE 8

Peanuts

In this test, shelled, first grade, large whole kernels were exposed to migrators for forty-eight (48) hours at a temperature of approximately 70° F.

| Migrator source | Flavor absorption | Flavor quality |
| --- | --- | --- |
| Imitation blue cheese flavor | a | XXX |
| Imitation butter and rum flavor | a | XXX |
| Soluble garlic flavor | a | XXX |
| Imitation butter flavor | b | XXX |
| Imitation mozzarella cheese flavor | b | XXX |
| Imitation hickory smoke flavor | b | XXX |
| Imitation black walnut flavor | b | XXX |
| Imitation bourbon fondant | b | XX |
| Imitation provolone cheese flavor | c | XX |
| Imitation cocoanut flavor | c | XX |
| Imitation arome grape flavor | c | XX |
| Oil orange U.S.P. | c | XX |
| Imitation banana | c | X |

EXAMPLE 9

Cashews

In this test, shelled, first grade, large whole kernels were exposed to migrators for forty-eight (48) hours at a temperature of approximately 70° F.

| Migrator source | Flavor absorption | Flavor quality |
| --- | --- | --- |
| Imitation butter and rum flavor | b | XXX |
| Imitation blue cheese flavor | b | XXX |
| Imitation banana flavor | c | XXX |
| Imitation bourbon fondant | c | X |

EXAMPLE 10

Absorption rate of hard cooked eggs

In this test, fresh eggs were boiled until they were hard cooked and were then cooled to ambient temperature. The temperature of the egg then was raised to approximately 130° F. and was subjected to a migrator, whereupon it was found to absorb flavor from the migrator at a much higher rate than the flavor absorption rate of raw eggs at 40° F.

EXAMPLE 11

Absorption rate of raw eggs

In this test, a raw egg having a temperature of 40° F. was placed in the chamber having a migrator at room temperature. The chamber and migrator were maintained at a temperature of approximately 70° F., and the temperature of the egg was allowed to rise to correspond with the temperature of its environment. The time required for flavor absorption was found to be reduced to approximately 3 to 4 hours, and the quantity and quality of flavor thus absorbed corresponded to that of an egg maintained at 40° F. for sixteen (16) hours.

EXAMPLE 12

Increasing the flavor of apples

In this test, unripe eating apples were placed in a chamber in the presence, but out of contact with, malic acid in the solid state and maintained at a temperature of approximately 70° F. for forty-eight (48) hours. Upon removal from the chamber it was found that the atmosphere within the chamber was saturated with sublimated malic acid, and that the apples had acquired a tree-ripened flavor of substantial and delectable tartness, whereas the texture and appearance of the apples were not adversely affected. Similar apples which were not subjected to this test lacked the improved flavor of the apples in this example.

EXAMPLE 13

Imparting a tree-ripened flavor to green pears

In this test green, unripe pears were placed in a chamber in the presence of, but out of contact with, malonic acid in the solid state and maintained at a temperature of approximately 70° F. for forty-eight (48) hours. Upon removal from the chamber it was found that the atmosphere within the chamber was saturated with sublimated malonic acid, and that the pears had acquired a tree-ripened flavor together with the yellow color characteristic of ripe pears. The texture also had changed from one of hardness to that of a mellow, juicy firmness also characteristic of a tree-ripened pear. Similar green pears which were not subjected to this test still retained their green appearance, hard texture and unripe taste at the end of the same test period.

EXAMPLE 14

Enhancing the flavor of mushrooms

In this test, full grown, regular size mushrooms were placed in a chamber in the presence of, but out of physical contact with, a migrator consisting of imitation mushroom flavor, and maintained at a temperature of approximately 40° F. for twenty-four (24) hours. Upon removal from the chamber it was found that the mushrooms had acquired a greatly enhanced and sharpened mushroom flavor, and that by comparison untreated mushrooms had a bland taste.

EXAMPLE 15

Improving the flavor of bananas

In this test, green bananas were divided into three different categories: whole and unpeeled, unpeeled and cut cross-wise in half so as to expose the cut surface, and peeled. The bananas of all three categories were placed in a chamber in the presence of, but separated from, ethyl alcohol and maintained at a temperature of approximately 70° F. for forty-eight (48) hours. Upon removal from the chamber, it was found that the bananas in all three categories tended to ripen in color and texture, and in addition acquired a zestful flavor. Similar bananas of the same categories showed a tendency toward softening and change of color, but lacked the zestful flavor acquired by the bananas which were in the chamber.

It is to be understood that where the term "migrator" is used herein, it refers particularly to a composition including an ingredient capable of being vaporized, and in the vaporized state to transmit a desired odor or chemical to the basic food being treated. In order to transmit such odor or chemical, it is necessary to penetrate the food. Certain foods contain a natural barrier to such penetration. Thus, the skin of apples contains a waxy substance which prevents penetration of some vapors while allowing penetration by others. Citrus fruits also contain a skin which serves as a barrier to penetration by some vapors while allowing penetration by others. It is therefore necessary that the migrator be selected to contain an ingredient which will penetrate the food as well as be absorbed by it. To aid in this, an auxiliary ingredient may be used. In some instances, the auxiliary ingredient selected to aid in penetrating the food, may itself be a carrier to aid in volatilizing the flavor-imparting ingredient. In other instances, a carrier may be used merely for the purpose of volatilizing the flavor-imparting ingredient. In still other instances, a fixative may be included in the composition to aid in preventing loss of the flavor once it has been imparted into the food. An example of a migrator consisting of a flavor-imparting ingredient alone, and which is capable of self-volatilization, and of penetrating the natural barrier in the food, would be malic acid with regard to apples, or ethyl alcohol with regard to bananas. An example of an auxiliary ingredient adapted to aid in penetrating the natural barrier of the food would be ethyl alcohol. An example of a migrator including a volatilizing ingredient would be a composition including benzaldehyde in solution. An example of a migrator including a fixative would be a composition comprising a fatty acid such as monocarboxylic having fourteen to eighteen carbons in chain length.

Certain migrator are capable of penetrating, and being absorbed by, the basic food at a rapid rate. Others penetrate more slowly. For purposes of differentiation I term the rapidly operating migrator a "high migrator," and the slowly operating migrator a "low migrator." As a general rule, high migrators are characterized by high volatility and a rleative absence of fixative in the composition. Examples of high migrators would include benzaldehyde (a cherry flavor), amyl acetate (a banana flavor), and hexahydrothymol (a minty flavor).

Low migrators, on the other hand, are generally characterized by either low volatility or the presence of fixative to retard vapor phase transition. Examples of low migrators would include ethyl vanillin (a vanilla flavor), cinnamic aldehyde (a cinnamon flavor), and methylnonylacetaldehyde (an orange flavor).

High migrators are especially adapted for use: when the time available for exposure of the basic food to the migrator, is short; when the exposure is required to take place at low temperature, and particularly when the natural barrier in the basic food includes large amounts of oil solubles in the outer layers; and when homogeneous distribution of imparted flavor in the basic food is required shortly after processing.

Low migrators are especially adapted for use: when the natural barrier in the basic food is minimal; when the exposure takes place at a higher temperature and it is desired to slow the rate of flavor penetration; and when time perimts a longer period of exposure.

It is to be understood that suitable controls may be incorporated in the migrator composition to increase or reduce the rate of penetration and absorption, and to increase the prevent of loss after flavor-impartation, by careful selection of the migrator ingredients and their proportions.

It will be further noted that submergence of the food in an atmosphere substantially saturated with migrator fumes, particularly when such submergence is within a closed container, subjects the food to an equal distribution throughout its surface, of penetration pressure by flavor-imparting molecules. Thus distribution of flavor into the food is maintained at a substantially equal rate and density.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

I claim:

1. The process of modifying the flavor of a fresh natural food which comprises the steps of:
   (1) subjecting a fresh whole fruit, vegetable, egg or nut which contains a natural barrier to vapor penetration to an atmosphere consisting essentially of the vapor of a chosen flavor imparting ingredient, said vapor being capable of penetrating said natural barrier,
   (2) continuing step (1) for a period of time sufficient to modify the flavor of the food.

2. The process of claim 1, wherein said food and atmosphere are disposed within a substantially closed container.

3. The process of claim 1, wherein said vapor of a flavor-imparting ingredient contains additionally a fixative adapted to prevent loss of the resultant flavor.

4. The process of claim 1, wherein the flavor-imparting ingredient is a precursor of the desired flavor which reacts with the food to develop said flavor.

References Cited

UNITED STATES PATENTS 3,330,669  7/1967  Hollenbeck _____ 99—166
2,305,620  12/1942  Kremers _____ 99—140

A. LOUIS MONACELL, Primary Examiner

W. A. SIMONS, Assistant Examiner

U.S. Cl. X.R.

99—113, 126, 140